(12) United States Patent
Bandyopadhyay et al.

(10) Patent No.: US 8,683,974 B2
(45) Date of Patent: Apr. 1, 2014

(54) PISTON

(75) Inventors: Deep Bandyopadhyay, Naperville, IL (US); Jonathan Dolak, Clarendon Hills, IL (US); Michael Goetzke, Orland Park, IL (US)

(73) Assignee: Electro-Motive Diesel, Inc., LeGrange, IL (US)

( * ) Notice: Subject to any disclaimer, the term of this patent is extended or adjusted under 35 U.S.C. 154(b) by 0 days.

(21) Appl. No.: 13/598,155

(22) Filed: Aug. 29, 2012

(65) Prior Publication Data
US 2013/0220266 A1  Aug. 29, 2013

Related U.S. Application Data

(60) Provisional application No. 61/528,533, filed on Aug. 29, 2011, provisional application No. 61/528,613, filed on Aug. 29, 2011.

(51) Int. Cl.
*F02F 3/00* (2006.01)

(52) U.S. Cl.
USPC ..................................... 123/193.6

(58) Field of Classification Search
USPC ............ 123/193.6, 263–285, 301; 29/888.04; 92/181 R
See application file for complete search history.

(56) References Cited

U.S. PATENT DOCUMENTS

| | | |
|---|---|---|
| 2,294,803 A | 9/1942 | Rich |
| 4,351,292 A | 9/1982 | Worthen et al. |
| 4,815,706 A | 3/1989 | Feuling |
| 5,033,426 A | 7/1991 | Reichenbach et al. |
| 5,431,137 A | 7/1995 | Elsbett et al. |
| 6,089,019 A | 7/2000 | Roby et al. |
| 6,298,718 B1 | 10/2001 | Wang |
| 6,314,933 B1 * | 11/2001 | Iijima et al. ............... 123/193.6 |
| 6,425,381 B1 | 7/2002 | Rammer |
| 6,470,864 B2 | 10/2002 | Kim et al. |
| 6,470,866 B2 | 10/2002 | Cook |
| 6,584,948 B2 | 7/2003 | Auer et al. |
| 6,694,735 B2 | 2/2004 | Sumser et al. |
| 6,732,703 B2 | 5/2004 | Eckerle et al. |
| 6,862,976 B2 | 3/2005 | Gaiser et al. |
| 6,880,510 B2 | 4/2005 | Laimbock |
| 7,025,031 B2 | 4/2006 | Mahakul et al. |
| 7,032,382 B2 | 4/2006 | Onodera et al. |
| 7,219,661 B2 | 5/2007 | Aberle |

(Continued)

OTHER PUBLICATIONS

International Searching Authority, "PCT International Search Report and Written Opinion of the International Searching Authority," Sep. 24, 2010.

(Continued)

*Primary Examiner* — Hung Q Nguyen
(74) *Attorney, Agent, or Firm* — Finnegan, Henderson, Farabow, Garrett & Dunner LLP

(57) ABSTRACT

A piston for an engine may include a piston crown, and a piston bowl recessed within the piston crown. The piston bowl includes a center portion, a cone portion, and an annular toroidal portion. The geometry of the piston bowl is designed to correspond with a fuel injection nozzle having a specific spray angle. An exemplary piston bowl may include a toroidal major diameter between about 4.645 and 4.895 inches and a toroidal minor radius between about 1.165 and 1.235 inches. The cone portion includes an angle between about 26 to 34 degrees. The compression ratio of the piston is about 17.95 to 1.

14 Claims, 4 Drawing Sheets

(56) References Cited

U.S. PATENT DOCUMENTS

| | | |
|---|---|---|
| 7,311,086 B2 | 12/2007 | Mahakul et al. |
| 7,370,627 B2 | 5/2008 | Mahakul et al. |
| 7,438,039 B2 | 10/2008 | Poola et al. |
| 7,571,607 B2 | 8/2009 | Vrbas |
| 7,571,608 B2 | 8/2009 | Boyapati et al. |
| 7,698,894 B2 | 4/2010 | Wood et al. |
| 2001/0035171 A1 | 11/2001 | Kim et al. |
| 2001/0049936 A1 | 12/2001 | Kenneth et al. |
| 2004/0182358 A1 | 9/2004 | Eckerle et al. |
| 2004/0216457 A1 | 11/2004 | Shea et al. |
| 2005/0050882 A1 | 3/2005 | Poola et al. |
| 2005/0160733 A1 | 7/2005 | Onodera et al. |
| 2005/0188944 A1 | 9/2005 | Mahakul et al. |
| 2006/0016187 A1 | 1/2006 | Swenson et al. |
| 2006/0021344 A1 | 2/2006 | Barba et al. |
| 2006/0070382 A1 | 4/2006 | Karlsson |
| 2006/0070603 A1 | 4/2006 | Stanton et al. |
| 2006/0150955 A1 | 7/2006 | Mahakul et al. |
| 2006/0288702 A1 | 12/2006 | Gokhale et al. |
| 2008/0149077 A1 | 6/2008 | Nau et al. |
| 2008/0216476 A1 | 9/2008 | Evers |
| 2009/0107447 A1 | 4/2009 | Styron |
| 2009/0211248 A1 | 8/2009 | Andreae et al. |
| 2009/0223218 A1 | 9/2009 | Winsor et al. |
| 2009/0249783 A1 | 10/2009 | Gokhale et al. |
| 2011/0023811 A1 | 2/2011 | Heilenbach et al. |
| 2011/0023854 A1 | 2/2011 | Heilenbach et al. |
| 2011/0061365 A1 | 3/2011 | Christensen |

OTHER PUBLICATIONS

International Searching Authority, "PCT International Search Report and Written Opinion of the International Searching Authority," Oct. 25, 2010.

* cited by examiner

PISTON

PRIORITY CLAIM

The present application is a non-provisional patent application which claims the benefit of U.S. provisional application Ser. No. 61/528,533, entitled "Reentry Piston Arrangement for a Two-Stroke Locomotive Diesel Engine," filed Aug. 29, 2011 and U.S. provisional application Ser. No. 61/528,613, entitled "Piston Arrangement for a Two-Stroke Locomotive Diesel Engine," filed Aug. 29, 2011, the complete disclosures thereof being incorporated herein by reference.

TECHNICAL FIELD

The present disclosure relates generally to an internal combustion engine and, more particularly, to a piston with a piston bowl for combustion in an internal combustion engine.

BACKGROUND

Engines, including diesel engines, gasoline engines, natural gas engines, and other engines known in the art, exhaust a complex mixture of air pollutants. The air pollutants may be composed of gaseous compounds, which include nitrogen oxides, and solid particulate matter, which includes unburned hydrocarbon particulates called soot.

Due to increased attention on the environment, exhaust emission standards have become more stringent. The amount of air pollutants emitted from an engine may be regulated depending on the type of engine, size of engine, and/or class of engine. Some methods that have been implemented by engine manufacturers to comply with the regulation of air pollutants exhausted to the environment may reduce these pollutants, but may do so at the expense of fuel efficiency.

The design of a piston bowl and the relationship of the piston bowl to the fuel injection system may affect the combustion process. The disclosed piston is directed at improving the emissions created by combustion within the engine consistent with regulations, while at the same time achieving desired fuel efficiency.

SUMMARY

In one aspect, the present disclosure is directed to a piston. The piston may include a piston crown, and a piston bowl recessed within the piston crown. The piston bowl includes a center portion, a cone portion, and an annular toroidal surface. The piston bowl may include a toroidal major diameter between about 4.645 and 4.895 inches and a toroidal minor radius between about 1.165 and 1.235 inches. The cone portion includes an angle between about 26 to 34 degrees. The compression ratio of the piston is about 17.95 to 1.

In another aspect, the present disclosure is directed to a piston. The piston may include a piston crown and a piston bowl recessed within the piston crown. The piston bowl includes a center portion, a cone portion, and an annular toroidal surface. The piston bowl may include a toroidal major diameter between about 6.4312 and 6.6812 inches and a toroidal minor radius between about 0.5587 and 0.6287 inches. The cone portion includes an angle between about 7 and 15 degrees. The compression ratio is about 17.9 to 1.

DETAILED DESCRIPTION

Figure 1:
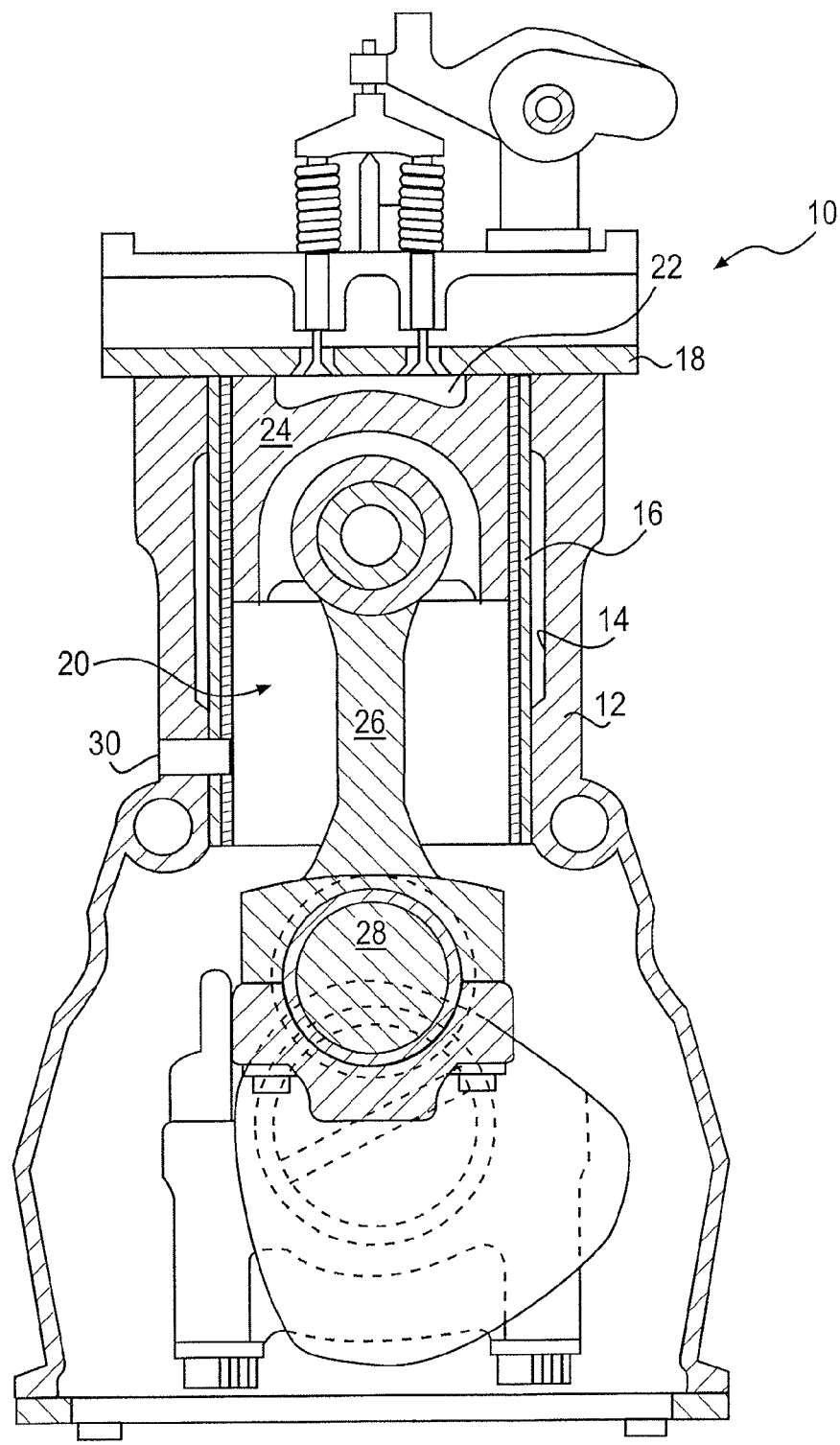
FIG. 1 is a cross-sectional illustration of an exemplary disclosed engine.

An exemplary internal combustion engine 10 is illustrated in FIG. 1. Engine 10 is depicted and described as a two-stroke diesel engine. However, it is contemplated that engine 10 may be another type of internal combustion engine such as, for example, a four-stroke diesel engine, a two- or four-stroke gasoline engine, or a two- or four-stroke gaseous fuel-powered engine. Engine 10 may include, among other things, an engine block 12 that at least partially defines a cylinder 14, a liner 16 disposed within cylinder 14, and a cylinder head 18 connected to engine block 12 to close off an end of liner 16. A piston 20 may be slidably disposed within liner 16 and, together with liner 16 and cylinder head 18, define a combustion chamber 22. Liner 16 may, if desired, be omitted.

Piston 20 may be configured to reciprocate between a bottom-dead-center (BDC) or lower-most position within liner 16, and a top-dead-center (TDC) or upper-most position. In particular, piston 20 may be an assembly that includes a piston crown 24 pivotally connected to a rod 26, which may in turn be pivotally connected to a crankshaft 28. Crankshaft 28 of engine 10 may be rotatably disposed within engine block 12 and each piston 20 coupled to crankshaft 28 by rod 26 so that a sliding motion of each piston 20 within liner 16 results in a rotation of crankshaft 28. Similarly, a rotation of crankshaft 28 may result in a sliding motion of piston 20. As crankshaft 28 rotates through about 180 degrees, piston crown 24 and connected rod 26 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into combustion chamber 22 via one or more gas exchange ports (e.g., intake ports) 30 located within liner 16. In particular, as piston 20 moves downward within liner 16, a position will eventually be reached at which ports 30 are no longer blocked by piston 20 and instead are fluidly communicated with combustion chamber 22. When intake ports 30 are in fluid communication with combustion chamber 22 and a pressure of air at intake ports 30 is greater than a pressure within combustion chamber 22, air will pass through intake ports 30 into combustion chamber 22. Fuel may be mixed with the air before, during, or after the air is drawn into combustion chamber 22.

Figure 3:
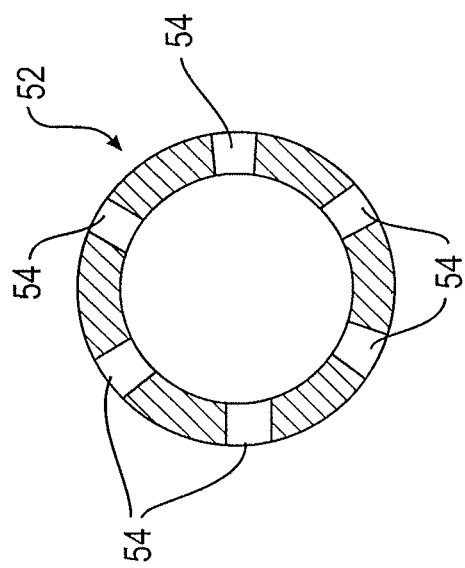
FIG. 3 is a cross-sectional view of the fuel injector nozzle of FIG. 2.
Figure 2:
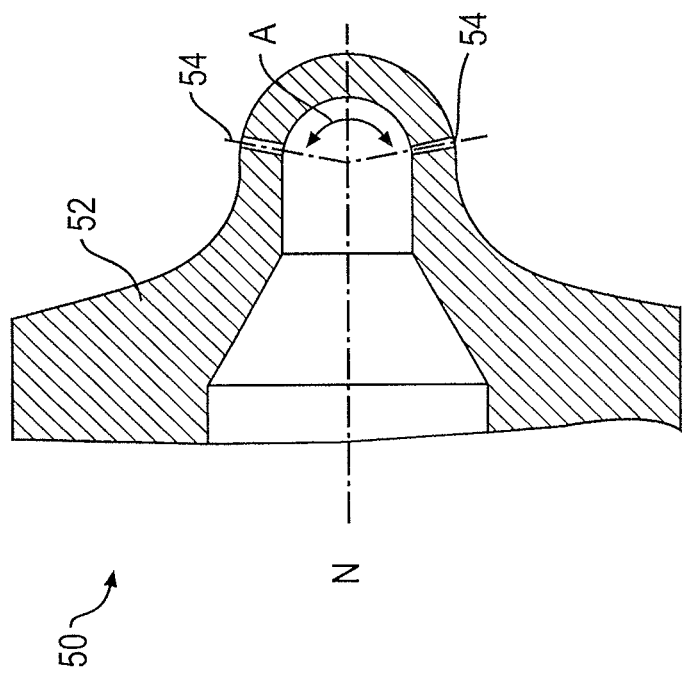
FIG. 2 is a cross-sectional side view of a fuel injector nozzle that may be used in conjunction with the engine of FIG. 1.

Fuel may be delivered to combustion chamber 22 via a fuel injector 50. The fuel injection system can be a common rail system, an electronic unit injector, or a mechanical unit injector. As illustrated in FIG. 2, fuel injector 50 may have a fuel injector nozzle body 52 housing a plurality of fuel injection holes (or nozzles) 54. Six fuel injection holes 54 are provided in the exemplary fuel injector 50 depicted in FIGS. 2 and 3. However, other numbers of fuel injection holes (e.g., 6-8) may be utilized. As illustrated in FIGS. 2 and 3, fuel injection holes 54 may be of equal size and may be equidistantly spaced concentrically around a nozzle centerline N of fuel injector nozzle body 52. The diameter of each fuel injection hole 54 may be between about 0.0133 inches and 0.0152 inches. The angle A (or spray angle) of fuel injection holes 54 may be between about 125 degrees and 155 degrees. Fuel injector 50 may generally direct fuel 180, 280 toward the bottom corner of a piston bowl. The spray angle may be determined based upon the geometry of the piston bowl. Two exemplary embodiments (100, 200) of a piston bowl will now be discussed.

Figure 4:
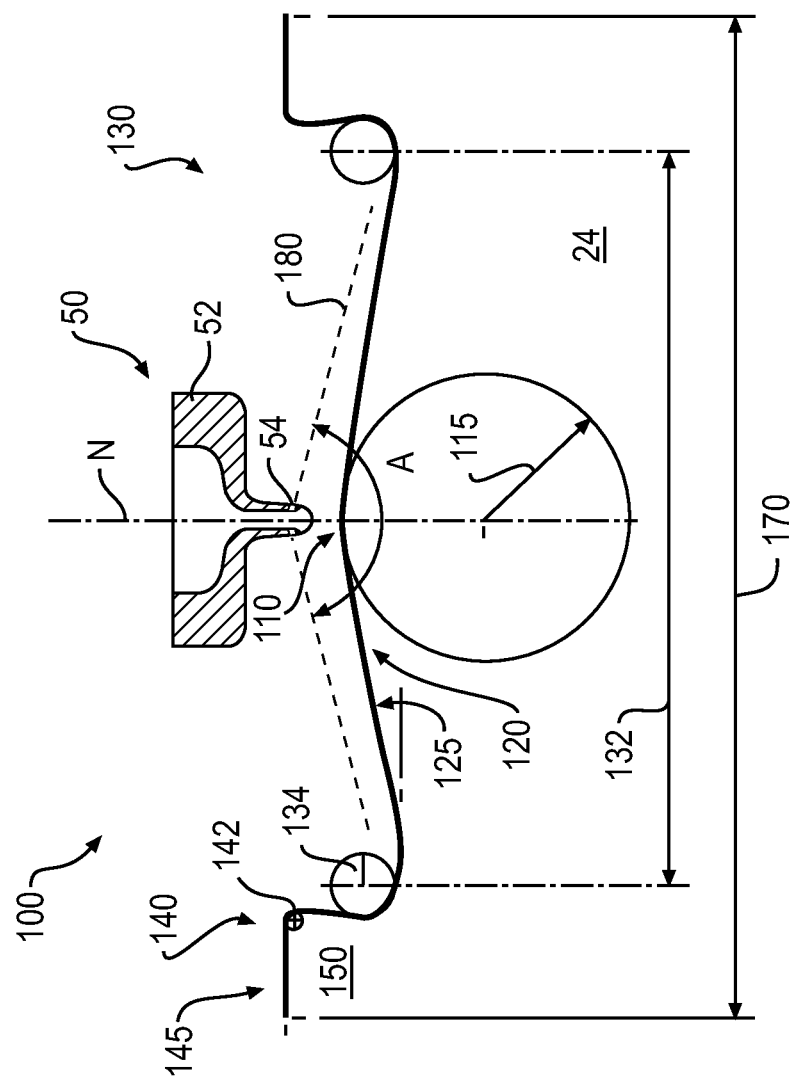
FIG. 4 is a diagrammatic side view of an embodiment of a piston that may be used in conjunction with the engine of FIG. 1.

As illustrated in FIG. 4, piston bowl 100 may be located on the combustion chamber 22 side of piston 20. Piston 20 may have a diameter 170 of about 9.0216 inches. Piston bowl 100 may include a center portion 110, a cone portion 120, a toroidal surface 130 and a sidewall 150. Collectively, center portion 110, cone portion 120, toroidal surface 130 and sidewall 150 may promote efficient mixing of the air, residual exhaust gases, and fuel in combustion chamber 22. Piston bowl 100 may provide a compression ratio of about 17.9:1 within cylinder 14.

Center portion 110 may have a generally spherical shape, and may have a center spherical radius 115 of about 2.57 inches. Center portion 110 may be aligned with fuel injector 50 such that fuel 180 delivered by fuel injector 50 may be uniformly distributed around center portion 110.

As illustrated in FIG. 4, cone portion 120 may surround center portion 110 and may form an angle 125 relative to center portion 110. Angle 125 may be between about 7 and 15 degrees.

As illustrated in FIG. 4, annular toroidal surface 130 is adjacent cone portion 120. Annular toroidal surface 130 may be defined in part by a toroidal major diameter 132 between about 6.6812 and 6.4312 inches, and a toroidal minor radius 134 between about 0.6287 and 0.5587 inches. Accordingly, the ratio of toroidal major diameter 132 relative to piston diameter 170 may be between about 1:1.35 and 1:1.40. The ratio of toroidal minor radius 134 relative to piston diameter 170 may be between about 1:14.35 and 1:16.15.

FIG. 4 further illustrates crown rim 140 forming a circle around center portion 110, cone portion 120, and toroidal surface 130. Moving away from center portion 110, crown rim 140 transitions into an upper flat rim face 145 of a sidewall 150. Sidewall 150 may include an annular wall of piston 20. Crown rim 140 may be further defined by a crown rim radius 142 that may be about 0.1535 inches.

As illustrated in FIG. 4, toroidal surface 130 may be defined by toroidal minor radius 134 which may be measured from a point submerged between about 1.687 and 1.767 inches below upper flat rim face 145.

Figure 5:
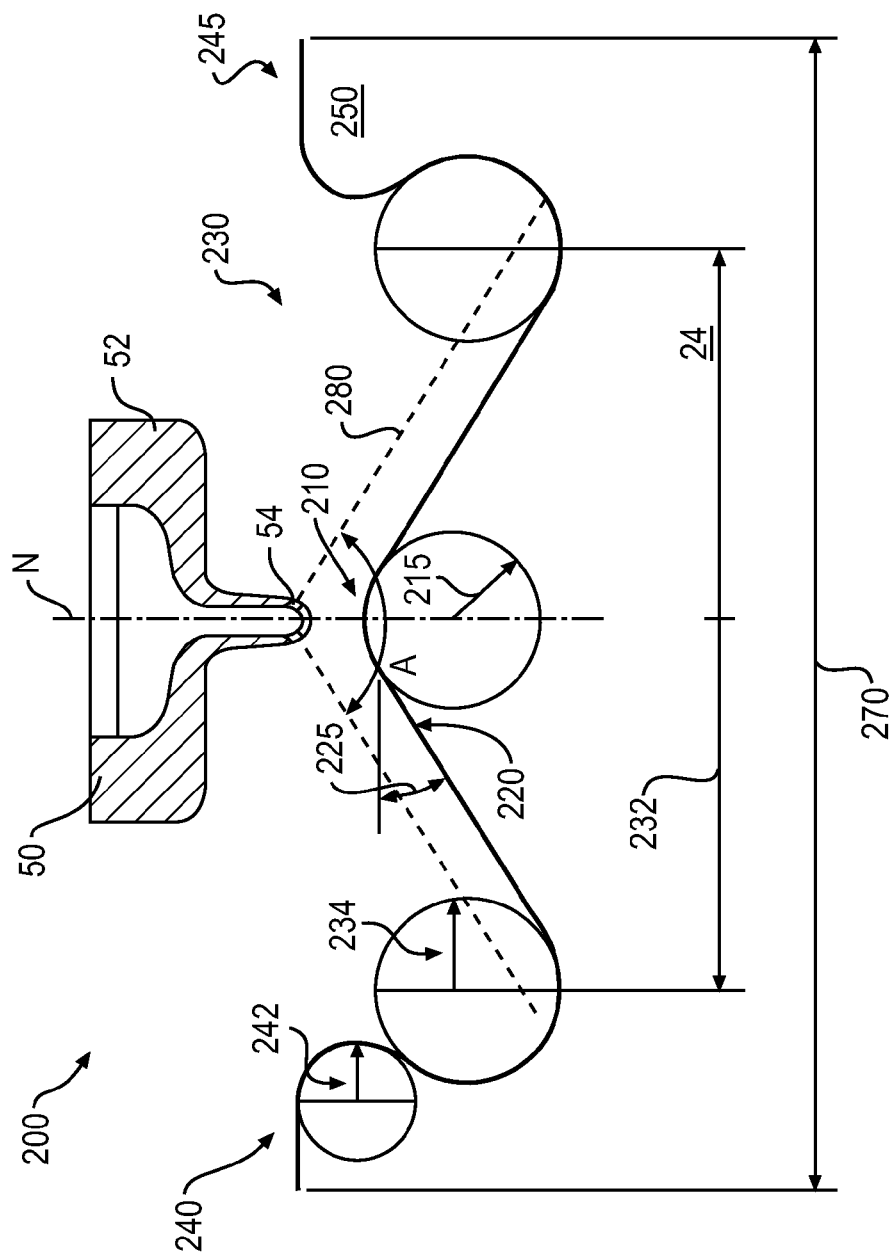
FIG. 5 is a diagrammatic side view of an alternate embodiment of a piston that may be used in conjunction with the engine of FIG. 1.

A second embodiment of a piston bowl 200 is illustrated in FIG. 5. Piston bowl 200 may be located on the combustion chamber 22 side of piston 20. Piston 20 may have a diameter 270 of about 6.206 inches. Piston bowl 200 may include a center portion 210, a cone portion 220, a toroidal surface 230 and a sidewall 250. Collectively, center portion 210, cone portion 220, toroidal surface 230 and sidewall 250 may promote efficient mixing of the air, residual exhaust gases, and fuel in combustion chamber 22. Piston bowl 200 may provide a compression ratio of about 17.95:1 within cylinder 14.

Center portion 210 may have a generally spherical shape, and may have a center spherical radius 215 of about 1.12 inches. Center portion 110 may be aligned with fuel injector 50 such that fuel 280 delivered by fuel injector 50 may be uniformly distributed around center portion 210.

As illustrated in FIG. 5, cone portion 220 may surround center portion 210 and may form an angle 225 relative to center portion 210. Angle 225 may be between about 26 and 34 degrees.

As illustrated in FIG. 5, annular toroidal surface 230 is adjacent cone portion 220. Annular toroidal surface 230 may be defined in part by a toroidal major diameter 232 between about 4.645 and 4.895 inches, and a toroidal minor radius 234 between about 1.165 and 1.235 inches. Accordingly, the ratio of toroidal major diameter 232 relative to piston diameter 270 may be between about 1:1.33 and 1:1.26. The ratio of toroidal minor radius 234 relative to piston diameter 270 may be between about 1:5.32 and 1:5.02.

FIG. 5 further illustrates crown rim 240 forming a circle around center portion 210, cone portion 220, and toroidal surface 230. Moving away from center portion 210, crown rim 240 transitions into an upper flat rim face 245 of a sidewall 250. Sidewall 250 may include an annular wall of piston 20. Crown rim 240 may be further defined by a crown rim radius 242 that may be about 0.754 inches.

As illustrated in FIG. 5, toroidal surface 230 may be defined by toroidal minor radius 234 which may be measured from a point submerged between about 0.584 and 0.664 inches below upper flat rim face 245.

INDUSTRIAL APPLICABILITY

The disclosed piston bowls 100, 200 and fuel injector 50 may be used in any internal combustion engine where a reduction in particulate emissions and soot production is desired, while maintaining a fuel efficient combustion process. In particular, the disclosed piston bowls 100, 200 and fuel spray angle A may together accomplish reduced particulate and soot emissions while not forfeiting fuel efficiency. The relationship of piston bowls 100, 200 and fuel injector 50 will now be explained.

Piston bowls 100 and 200 may differ by their respective geometries. In each case, fuel spray angle A may be adjusted to achieve the longest spray length possible depending on the type of piston bowl geometry being utilized. The fuel spray angle A may be parallel, or generally parallel, to the cone angle 125, 225.

Piston bowl 100 may have a relatively more shallow and wide piston bowl in comparison to the more deep and narrow piston bowl 200. With regard to piston bowl 100, a relatively larger fuel spray angle A may create a situation where fuel 180 may have the longest spray length possible without wall impingement, which may allow for a cleaner combustion process.

Conversely, with piston bowl 200 a smaller fuel spray angle A may create a similar situation where fuel 280 may have the longest spray length possible without wall impingement, which may likewise allow for a more efficient and clean combustion process. In the embodiment of FIG. 5, the sidewalls 250 may have an overhang portion to account for fuel that reflects from the corner of the piston bowl.

It will be apparent to those skilled in the art that various modifications and variations can be made to the disclosed piston bowls and fuel injector without departing from the scope of the disclosure. Other embodiments of the piston bowls and fuel injector will be apparent to those skilled in the art from consideration of the specification and practice of the piston bowls and fuel injector disclosed herein. It is intended that the specification and examples be considered as exemplary only, with a true scope of the disclosure being indicated by the following claims and their equivalents.

What is claimed is:

1. A piston for an internal combustion engine, comprising:
a piston crown;
a piston bowl recessed within the piston crown, the piston bowl including a center portion, a cone portion, and an annular toroidal surface, the piston bowl having:
a toroidal major diameter between about 4.645 and 4.895 inches; and
a toroidal minor radius between about 1.165 and 1.235 inches; and
wherein the cone portion includes an angle between about 26 and 34 degrees and a compression ratio of the piston is about 17.95 to 1.

2. The piston of claim 1, wherein the piston further includes a center spherical radius of about 1.12 inches.

3. The piston of claim 1, wherein the piston has a diameter of about 6.206 inches.

4. The piston of claim 1, wherein the piston is configured for use with a fuel injector, the fuel injector including:
a nozzle body;
fuel injection holes within the nozzle body, wherein the fuel injection holes are configured to deliver fuel at an angle between about 130 and 155 degrees relative to a midpoint of the nozzle body.

5. The piston of claim 4, wherein the fuel injector further includes 6-8 fuel injection holes.

6. The piston of claim 5, wherein the fuel injector includes 6 equal size fuel injection holes spaced equidistant from each other around the circumference of the nozzle body.

7. The piston of claim 6, wherein the fuel injection holes have a diameter between about 0.0133 and 0.0152 inches.

8. A piston for an internal combustion engine, comprising:
a piston crown;
a piston bowl recessed within the piston crown, the piston bowl including a center portion, a cone portion, and an annular toroidal surface, the piston bowl having:
a toroidal major diameter between about 6.4312 and 6.6812 inches; and
a toroidal minor radius between about 0.5587 and 0.6287 inches; and
wherein the cone portion includes an angle between about 7 and 15 degrees and a compression ratio of the piston is about 17.9 to 1.

9. The piston of claim 8, wherein the piston further includes a center spherical radius of about 2.57 inches.

10. The piston of claim 8, wherein the piston has a diameter of about 9.0216 inches.

11. The piston of claim 8, wherein the piston is configured for use with a fuel injector, the fuel injector including:
a nozzle body;
fuel injection holes within the nozzle body, wherein the fuel injection holes are configured to deliver fuel at an angle between about 130 and 155 degrees relative to a midpoint of the nozzle body.

12. The piston of claim 11, wherein the fuel injector further includes 6-8 fuel injection holes.

13. The piston of claim 12, wherein the fuel injector includes 6 equal size fuel injection holes spaced equidistant from each other around the circumference of the nozzle body.

14. The piston of claim 13, wherein the fuel injection holes have a diameter between about 0.0133 and 0.0152 inches.

* * * * *